No. 807,287. PATENTED DEC. 12, 1905.
F. E. KINSMAN.
SIGNALING AND TRAIN CONTROLLING SYSTEM FOR RAILWAYS.
APPLICATION FILED APR. 18, 1905.

Witnesses:

Inventor:
Frank E. Kinsman
by
Atty.

No. 807,287. PATENTED DEC. 12, 1905.
F. E. KINSMAN.
SIGNALING AND TRAIN CONTROLLING SYSTEM FOR RAILWAYS.
APPLICATION FILED APR. 18, 1905.

Witnesses:

Inventor:
Frank E. Kinsman,
by
Att'y

UNITED STATES PATENT OFFICE.

FRANK E. KINSMAN, OF PLAINFIELD, NEW JERSEY.

SIGNALING AND TRAIN-CONTROLLING SYSTEM FOR RAILWAYS.

No. 807,287.  Specification of Letters Patent.  Patented Dec. 12, 1905.

Application filed April 18, 1905. Serial No. 256,289.

*To all whom it may concern:*

Be it known that I, FRANK E. KINSMAN, a citizen of the United States, and a resident of Plainfield, in the county of Union and State of New Jersey, have invented certain new and useful Improvements in Signaling and Train-Controlling Systems for Railways, of which the following is a specification.

This invention relates to a signaling and train-controlling system for railways, and especially to a system for automatically controlling and stopping the movement of a vehicle on a line of way or railway when there is a danger condition ahead of the same, the present invention being in the nature of an improvement upon the automatic train-stopping system disclosed in prior patents granted to me.

One of the principal objects of this invention is to provide a controlling apparatus or system so combined with train-signaling means—such, for example, as a block-signal system—that the signaling means or signaling system is governed by the automatic controlling means and indicates a danger condition whenever the automatic controlling means does so. Preferably the automatic controlling or train-stopping means and the train-signaling means or block-signal system are so combined that each governs the operation of the other, each serving when a danger condition is present therein to put the other in the same condition. By combining these two mechanisms or systems in this manner each will serve as a detector for the other and neither will be in condition to indicate that it is safe for a vehicle or train to proceed if the other is in condition to indicate that it would be dangerous for such vehicle or train to proceed. The means employed for automatically controlling the movement of a vehicle or train will preferably embody a normally closed track-circuit, by which I mean a circuit having a fixed position on the line of way which may operate upon the power, brake, or other movement-controlling media on a vehicle in any of the ways set forth in my prior patents. Preferably this normally closed track-circuit will operate upon such power, brake, or other medium substantially in the manner disclosed in my prior patent, No. 735,527, granted August 4, 1903—that is to say, by varying the electrical characteristics of a normally closed circuit in such a manner that the train-stopping means will be operated upon, for example, when a portion of the resistance is out of such normally closed circuit, but will not be operated upon when such resistance is not short-circuited.

The signaling means, which coöperates with the means for automatically controlling the movement of a vehicle, may be of any proper type, usually a block-signal system, in order that the movements of vehicles or trains may be automatically stopped, if necessary, at some point within a predetermined interval or block. The system preferably employed in conjunction with my improved automatic train controlling or stopping means is a normal danger system of block-signals—that is, a system of block-signals in which danger is always indicated unless a vehicle or train on arriving at a predetermined point closes a circuit, which shows that there is no danger condition present in the block ahead.

My invention includes any normal danger system of block-signals coöperative with automatic means for controlling the movement of a vehicle or train protected by such normal danger system of signals in which one of said main elements is controlled by the other, though, preferably, as before stated, each of these main elements governs the other—that is to say, if there is a danger condition present in the automatic train-controlling means it will put the normal danger system of block-signals in condition for indicating "danger," and if there is a danger condition present in the normal danger system of block-signals the automatic means for controlling the movements of the vehicle or train will at the proper point be put in condition for indicating "danger."

In accordance with my invention herein disclosed an automatic means or system for controlling the movement of a vehicle or train traveling on a line of way or railway may be combined with a normal danger system of block-signals to protect vehicles of any type operated by power in any form, although in the drawings I have illustrated only the application of this invention to a system for controlling the movements of vehicles operated by fluid-pressure, such as steam, regulated by a throttle-valve and throttle-lever.

No matter what the particular type of signaling means may be, whether it be a normal danger system of block-signals or some other signaling means, and no matter what the particular construction may be of the means for controlling the movement of the vehicle or train, at least one and preferably both of these main elements or systems will embody a detector device responsive to a danger condition of the other, so that if there is anything wrong with one system, no matter which it may be, the other will not only be put in a condition representing "danger," but will also control the operation of means for indicating that such a danger condition is present. In the construction shown the detector which governs the signaling means or block-signal system will usually merely set a semaphore or other signal to "danger." The detecting means which governs the automatic train controlling or stopping means will preferably be so constituted as to be capable of responding selectively to different conditions of those parts thereof located on the roadway, and particularly of responding selectively to different electrical conditions or characteristics of a fixed controlling-circuit adjacent to the tracks.

One of the principal features of my present invention relates to a system for automatically controlling the movements of vehicles, in which system differentiated characteristics of a track-circuit which is preferably normally closed are made use of to indicate whether a danger or a safety condition is present at a given point when a vehicle or train passes such point and to make a record of such condition which will represent exactly the electrical condition of the system at that point at such time, and will thus constitute an effective means for determining whether engineers or motormen have proceeded with due regard to signals or whether their vehicles have been checked or stopped as a result of disregarding such signals. As to certain of these features, my present invention is in the nature of an improvement on that shown, described, and claimed in a prior application filed by me March 6, 1905, Serial No. 248,532. One of the principal elements of this portion of my present invention is indicating or recording means for indicating or recording danger and safety conditions of the automatic means for controlling the movement of the vehicle, as well as the non-working condition of such automatic controlling means when the vehicle is not adjacent to the point of control.

Other features of my invention not hereinbefore referred to will be hereinafter described and claimed and are illustrated in the accompanying drawings, in which—

Similar characters designate like parts in all the figures of the drawings.

Figure 1:
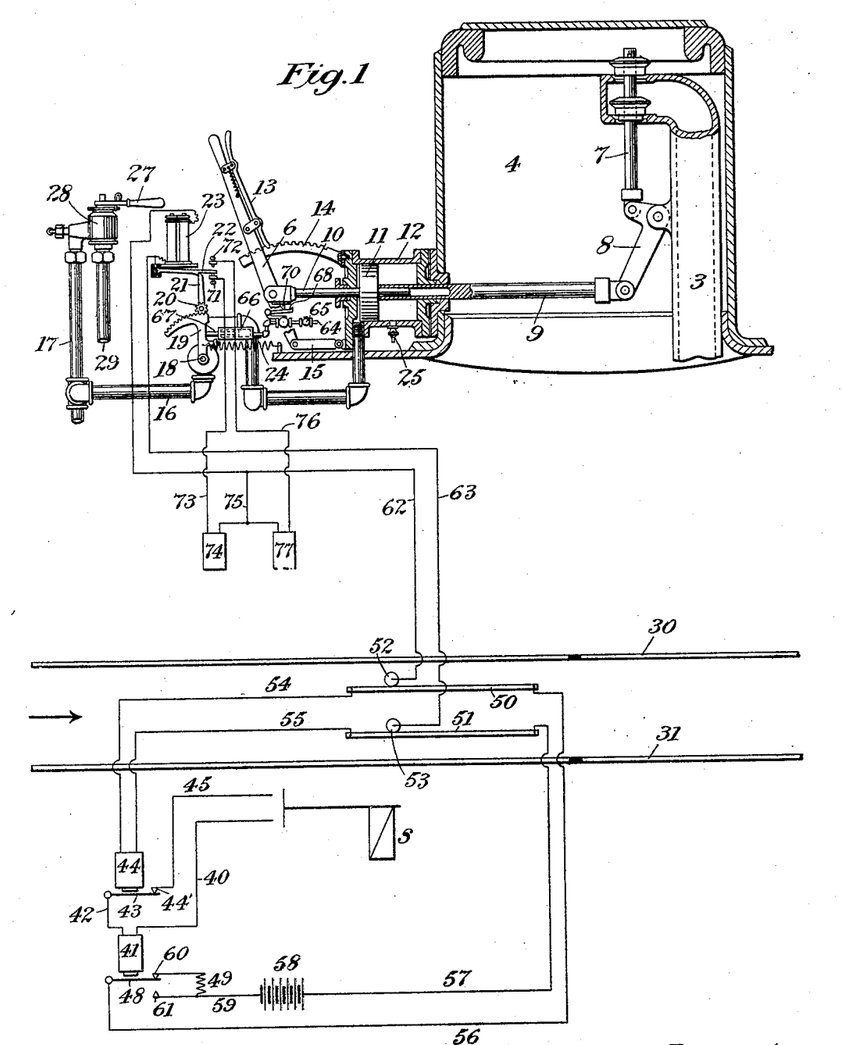
Figure 1 is partly a diagrammatic view and partly a sectional side elevation of a portion of a locomotive-cab, illustrating my present invention, adapted for use with a compressed-air-brake system and shows the automatic controlling means at the track and on the vehicle in the normal position.
Figure 2:
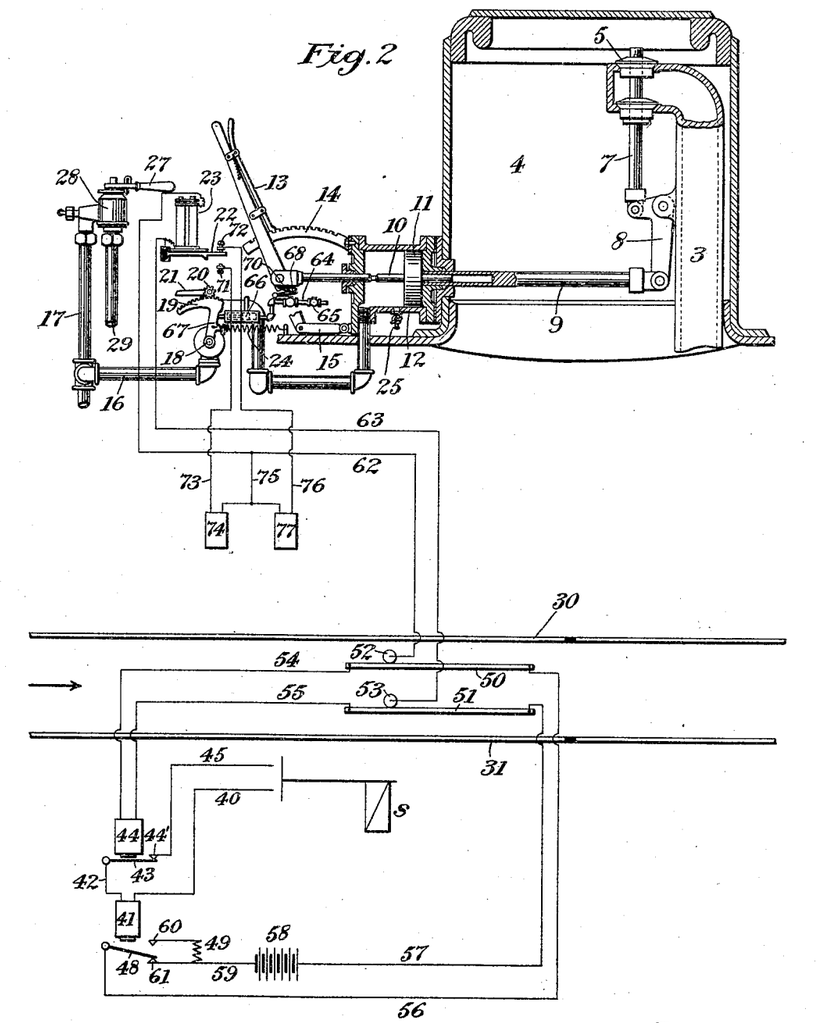
Fig. 2 is a similar view illustrating the automatic controlling means at the track and on the vehicle in the danger or working position, with the brake system open to the atmosphere and the steam cut off on the vehicle.

Referring particularly to Figs. 1 and 2, I have illustrated in these views automatic controlling means on a locomotive-engine for shutting off the power and applying the brake or brakes of an air-brake system when there is a danger condition ahead of the vehicle, and I have also illustrated in these views resetting means similar to that disclosed in my prior patent and application hereinbefore referred to for restoring the automatic controlling means on the vehicle to a normal position in readiness for stopping the vehicle again after such automatic means has been operated. These various features are illustrated in connection with a locomotive deriving its power from a steam-boiler (not shown) having the usual main steam-pipe 3, extending into the steam-dome 4 and controlled by a throttle-valve 5 for throttling the flow of steam into such pipe. Normally this throttle-valve is operated by a manual power-controller in the form of a throttle-lever 6. The valve-stem 7 of the throttle-valve is connected at its lower end to the usual angle-lever 8, which in turn is connected to a two-part piston-rod, one member of which is shown at 9 and is tubular or bored at one end, and the other member of which is shown as a rod 10, extending into the tubular portion of the rod 9. The piston 11, which works in the cylinder 12, is secured in this case directly to the rod 9, and the rods 9 and 10 have a sliding connection, but are normally held together in the relative positions shown in Fig. 1 by means of a coupling device (not shown) of the type illustrated in my prior patents, this coupling device forming a slip-joint. The rod 10 is connected directly to the throttle-lever, and when the parts 9 and 10 of the piston-rod are clutched together it serves to operate the throttle-valve in the usual manner; but when the piston 11 is operated automatically by the action of the automatic controlling means the part 10 of the piston-rod is not operated, the piston 11 and the part 9 of the piston-rod being actuated at such time by power. The manual controller or throttle-lever 6 may be normally locked in any desired position by the usual spring-pressed locking detent or latch 13, coacting with a toothed locking-segment 14 of the well-known construction. At its lower end the throttle-lever is pivoted to a guide-link 15, connected to a fixed point.

The automatic control of a vehicle or train is preferably effected by controlling means common to the motive power and brake system of a vehicle and is substantially of the same construction as the automatic controlling means shown and described in my prior patent, before specified. As in the construction shown in said patent, a common controlling-valve or relief-valve for the throttle-valve of a fluid-pressure engine or steam-engine and for the fluid-pressure brakes of the brake system is placed in the proper pipe of the brake system for the purpose in this case of automatically releasing the air-pressure in an emergency, and thereby operating the brakes and also operating the throttle-valve by air-pressure in said brake system. In this construction this automatic relief-valve is in a pipe 16, connecting the brake-pipe or train-pipe 17 with the cylinder 12 at the rear of the piston 11. The stem of this automatic relief-valve is shown at 18, and the valve itself is controlled by a segment 19, secured to the valve and meshing with a pinion 20, carrying a stop-arm 21, normally held by a detent on the armature 22 of a controlling-electromagnet 23, governed by a danger condition on the line of way. This electromagnet is here connected with a short circuit on the vehicle, which short circuit is controlled by a track-circuit in a manner which will be hereinafter described in detail.

The parts just described are so constructed and organized as to permit the automatic relief-valve to be operated to open communication between the pipe 17 and the cylinder 12 when the stop-arm 21 is released by the armature 22. Any suitable means may be employed for effecting this movement of the valve, a spring 24 being shown herein as connected to the segment 19 and to a suitable fixed point for this purpose. When said valve, its segment, and the coacting parts are shifted to the positions shown in Fig. 2, the pressure in the train-pipe will be let off through the pipe 16, and the piston 11 will be moved to the right, as shown in said view, the two parts of the piston-rod being uncoupled by this action, while the trottle-lever remains in a fixed position. The movement of the piston 11 to the right in said view will continue until the throttle-valve is closed, as shown. The fluid-pressure or air in the cylinder 12 is preferably permitted to escape through an exhaust-port in an exhaust-cock 25, similar to that shown in my said prior patent, which action also enables the piston 11 to be readily returned to its normal position manually by the throttle-lever. The automatic release of the air from the pipe 17, through the pipe 16 and the cylinder 12 into the air, results in the automatic application of the brakes of the vehicle or train. The manual application of such brakes under ordinary circumstances—that is, when there is no emergency condition present necessitating the automatic action just described—may be effected in the usual manner by an ordinary manual controller or brake-handle 27, connected to the usual three-way valve in a casing 28, the brake-pipe or train-pipe being normally in communication through this three-way valve with a pipe 29, leading to an air-reservoir. (Not shown.)

The automatic controlling devices just described for shutting off the power and applying the brakes or other movement-controlling medium may be governed by any suitable means controlled by a danger condition of any kind on the line of way and constitute the main moving or traveling portion of the automatic means for controlling the movement of the vehicle. In the present case the only danger condition which will be considered is the presence of another vehicle or train on the block ahead, the presence of such vehicle usually being indicated by a semaphore or other signal of the signaling system, such as a block-signal system.

In the diagrammatic portion of Fig. 1 I have illustrated in connection with the devices just described a portion of one of the tracks of a railway, both of the rails of said track constituting in this instance sectional conductors forming parts of corresponding block-circuits. The rails of each block are designated by 30 and 31, respectively, they being connected, as will appear by reference to Fig. 6, in a normally closed circuit formed by a source of energy or battery, such as 32, connected to said rails at the forward end of a block, and by a relay or equivalent device 33, connected to the opposite ends of said rails—that is, at the rear end of said block.

Figure 6:
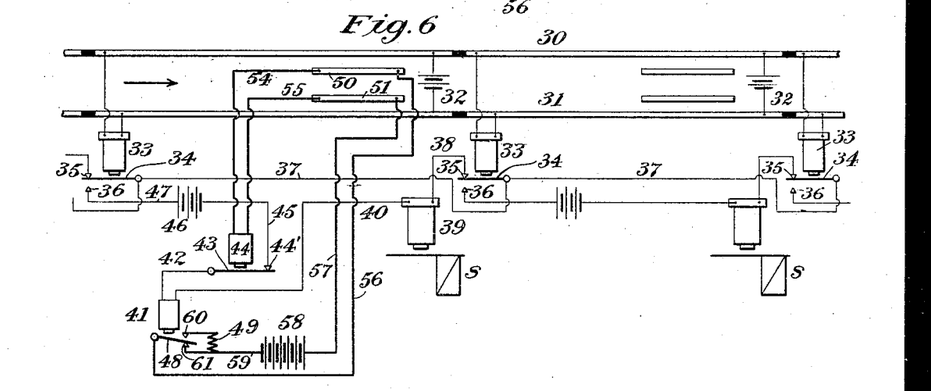
Fig. 6 is a diagrammatic view illustrating the track-circuits and devices of the automatic controlling or train-stopping circuit and also shows the circuits and controlling-relays of a normal danger system of block-signals coöperative with such circuit of the automatic train-stopping means.

While any suitable means or block-signal system may, as before stated, be used in connection with the other features of my present invention, I prefer to employ in connection with the automatic means for controlling the movements of a vehicle a coacting or complementary controlling means, such as a normal danger system of block-signals, a simple type of which is clearly illustrated in Fig. 6. The batteries 32 and the relay-magnets 33 at opposite ends, respectively, of the different blocks shown in said figure constitute important controlling elements of such normal danger system. Each relay 33 in this construction embodies a switch 34, the free end of which may coact with and engage either one of a pair of contacts 35 and 36 according as the coils of the relay magnet are or are not energized. All of these switches 34 are shown as connected directly to one another by means of conductors 37, and through each conductor 37 and the rear switch 34 of its block contact is made with an upper contact 35. Each upper contact 35 is connected with the lower contact 36 of the block in the rear thereof, and in this case various controlling devices are connected between each such upper contact 35 and the lower contact 36 of the block in the rear. In the diagram a conductor 38 is connected directly to such upper contact 35, whence it passes to the main signal-controlling device or signal-magnet 39 for operating a semaphore or other equivalent signals. From this signal-controlling device or magnet 39 a conductor 40 extends to the electrical controlling device or magnet 41, which governs the automatic means for controlling the movement of a vehicle and assures the presence of a danger condition in the automatic means or circuit for controlling the movement of the vehicle whenever such danger condition is present in the corresponding portion of the block-signal system. From the electrical controlling device or magnet 41 a conductor 42 extends in this construction to a switch 43 of a relay or other electrical controlling device, the coils of the relay being designated by 44 and forming part of the means for automatically controlling the movements of a vehicle. The switch 43 is normally in engagement with a contact 44', from which a conductor 45 extends to one side of a source of energy or battery, such as 46, the other side of which is connected by a conductor 47 with the lower contact 36 at the rear end of the block, in which the devices just described are connected.

The normal condition of the system just described is illustrated in Fig. 6, from which it will be seen that in each block a circuit is normally closed through the track-rails 30 31 and the battery 32 and relay 33. This normally closed circuit serves to close the gaps between the switches 34 and the upper contacts 35. Each block-circuit of the normal danger system just described has a normally closed break at the forward end of the block and a normally open break at the rear end of such block, and hence the signal-controlling device 39 is normally inoperative or deënergized and the semaphore or other signal device stands at "danger," as shown. If now a vehicle enters a block, the controlling-relay at the rear end of such block is short-circuited and the coils 33 are deënergized, this action permitting the switch 34 to drop, breaking at 35 the circuit of the block in the rear and closing at 36 the circuit of its own block. If there is no train on the block ahead, a circuit is now complete from the battery 46 through conductor 45, contact 44', switch 43, conductor 42, magnet 41, conductor 40, magnet 39, conductor 38, contact 35 at the forward end of the block, switch 34 of the preceding block, conductor 37 of its own block, switch 34 at the rear end of its own block, contact 36, and conductor 47. The circuit thus closed causes the energization of the magnet 39 and the setting of the semaphore $s$ to the clear position. If the circuit is closed at the contact 36 at the rear end of the block while the circuit is open at the contact 35 at the forward end of the block, the signal of course remains unaffected and in the danger position.

For the purpose of governing the operation of the main controlling-magnet 23 on the traveling vehicle I prefer to make use of controlling means at the track, such as an electric circuit, adapted to be brought intermittently into coöperative relation with those parts of the automatic controlling or train-stopping means which are located on the vehicle. This controlling track-circuit for governing the movement of the vehicle is preferably normally closed and is adapted to exhibit different characteristics according as it is safe or dangerous for a train or other vehicle to proceed beyond the point at which such controlling means is located. Usually different electrical conditions or characteristics of such controlling-circuit for governing the movement of a vehicle will result from increasing or decreasing the strength of the current flowing in a given portion of the circuit by cutting out or interpolating resistance in such circuit or portion thereof. This resistance may be controlled in any desired manner, either manually or automatically; but in the system shown herein it is governed automatically by the electrical controlling device 41, governed by the other main controlling means—to wit, the circuit of the block-signal system, here shown as a normal danger system of block-signals. Thus when the electrical controlling device 41 is deënergized, which is normally the case, because the block-circuit of the normal danger system is normally open and the semaphore or other signal $s$ in a danger position, a circuit-controller or switch, such as 48, governed thereby, may operate to cut out of the track-circuit of the means for automatically controlling the movement of a vehicle a resistance such as 49. This resistance 49 is included wholly in the automatic train-stopping circuit and does not in any way influence the operation of the signal-controlling means of the block system and is not in any way connected with the block-circuit of the normal danger system.

The circuit in which the resistance 49 is connected is preferably a simple one and is indicated in Fig. 6 by heavy lines to distinguish it from the block-circuit of the normal danger system. This track-circuit includes in this case two track-contacts, such as the short contact-rails 50 and 51, these rails being disposed in the path of traveling contact-makers, such as 52 and 53 on the vehicle, and being disposed side by side, preferably between the track-rails 30 and 31. At their rear ends these contact-rails are shown as connected by conductors 54 and 55 with the opposite terminals of the electrical controlling device or relay-coils 44. At their forward ends these contact-rails are shown as connected, respectively, by means of conductors 56 and 57, with the circuit-controller or switch 48 and a source of energy or battery 58. The other terminal of said battery is connected to a conductor 59, which leads directly to the lower of the two contacts 60 and 61, controlled by the switch 48, the upper contact being connected directly to the resistance 49, which is also connected to the conductor 59. Thus it will be seen that current from the battery 58 may flow through either of two parallel branches, one of which includes and the other of which excludes the resistance 49, according as the controlling device 41 is or is not energized. It will also be seen that whether said controlling device 41 is energized, as is the case when the block-circuit of the normal danger system is closed, or whether said controlling device is deënergized, as is the case when the block-circuit of the normal danger system is open, the circuit through the battery 58 will always normally be closed. When the resistance 49 is cut out, as is normally the case, this track-circuit of the means for controlling the movement of the vehicle will be in condition for energizing the main controlling-magnet 23 on the vehicle or train and of checking or stopping such vehicle or train. Hence the system disclosed herein for automatically controlling the movement of a vehicle is a normal danger system of controlling such movement, just as the block-signal system is a normal danger system of block-signals, and the conditions are such that the train on reaching the contact-rails 50 51 will always be stopped unless the track is clear ahead. This is due to the fact that the resistance 49 is cut in or out in harmony with the making or breaking of the block-circuit of the normal danger system of block-signals, said resistance being normally cut out, as shown in Fig. 6, to represent a danger condition, but being cut in by the energization of the magnet 41 whenever both the forward and the rear breaks in the adjacent block-circuit of the normal danger system of block-signals are closed. The resistances of the automatic controlling-circuit just described are so adjusted and the current supplied by the battery 58 is of such strength that the main controlling-magnet 23 will not be energized sufficiently to attract its armature when the resistance 49 is in circuit, but will attract its armature when said resistance is cut out, as shown in Fig. 6. The coils of the relay 41 and the armature 48 thereof therefore govern the normal controlling function and also the differentiated working or emergency function of the normally closed track-circuit for governing the movement of a vehicle on the line of way protected by such circuit, it being evident that when the closed circuit is through the working branch of low resistance, which it follows when the resistance 49 is cut out, a current of maximum efficiency or strength will influence the main controlling-magnet 23 on the vehicle when said magnet is in the field of action of said track-circuit.

When the circuits of both of the main controlling means hereinbefore described—to wit, the system of block-signals and the automatic train-stopping means—are in proper working condition, the train-stopping track-circuit will only be effective for stopping a train when the block-circuit of the block-signal system is interrupted and the magnet 41 deënergized. At such time the engineer or motorman of an approaching train or vehicle is warned by the signal s that there is a danger condition ahead, and unless he stops his train before reaching the track-contacts 50 and 51 the working current in the train-stopping track-circuit will pass through a short circuit on the train on the engagement of the traveling contact-makers on the train with said track-contacts, and the controlling-magnet 23 will be energized and the train automatically stopped by the devices hereinbefore described, practically all of the resistance of the track-circuit being eliminated at this time from the branch through which current flows to the magnet 23, owing to the fact that the resistance 49 is cut out and to the further fact that the coils 44 or the branch in which they are included are or is of high resistance, requiring but little current to keep the armature 43 attracted.

A simple type of electric circuit, with its included traveling contact-makers, may be employed on the vehicle or train for coöperation with the train-stopping track-circuit and the track-contacts shown herein. In this case the short circuit for operating the automatic controlling means on the vehicle includes only the contact-making or current-collecting devices 52 and 53 and a pair of conductors 62 and 63, leading to the main controlling-electromagnet 23. Any suitable type of current-collecting devices may be employed—such, for example, as the collecting means shown in my prior patent hereinbefore specified.

In order that the two coacting or complementary controlling means, one of which governs a signal and the other of which governs the movements of the vehicle, may operate properly under all conditions, it is important that provision be made which will render it impossible for either the block-signal circuit or the train-stopping circuit to be in the condition representing safety if the other is not in working condition or for any other reason is in a condition corresponding to or representing danger. Because of this I prefer to supply each of such circuits with a detector device, the function of which is to respond to a danger condition of one circuit and establish immediately a danger condition in the other circuit. Thus if the block-signal circuit is broken, the coils of the relay 41 are deënergized and the armature 48 of this relay is retracted, cutting out the resistance 49 from the train-stopping track-circuit, and thereby establishing a danger condition in such track-circuit. This relay constitutes a detector device which is governed by the block-signal circuit and governs said train-stopping track-circuit. The coils of the relay 44 when energized attract the armature 43 and normally keep one break in the block-signal circuit closed—to wit, the break between said armature 43 and the contact 44'. If for any reason the coils 44 of this relay are not sufficiently energized to attract said armature, this break in the block-signal circuit in the normal danger system of block-signals will be opened, and even though both the forward and the rear breaks in the normal danger block-signal circuit be closed it will be impossible for such block-signal circuit to energize the signal-magnet 39 and set the semaphore $s$ to "safety." Thus this relay constitutes a detector device which is governed by a danger condition in the train-stopping track-circuit, and when such danger condition is present said relay immediately establishes a corresponding danger condition in the normal danger block-signal circuit and assures the holding of the semaphore $s$ in the danger position. This detector device will hold this third break in the block-signal circuit closed at all times if the train-stopping track-circuit is in working condition—that is to say, if it is not actually interrupted at some point or if the battery is not exhausted or too weak to control the circuit properly or some other extraordinary condition renders such circuit ineffective.

For the purpose of enabling the engineer or motorman of a train or vehicle equipped with automatic controlling means for governing the movement of a vehicle to reset the controlling mechanism on his vehicle without loss of time and to proceed without unnecessary interruption to the schedule in force on the road on which his vehicle or train is running I provide resetting means for restoring the automatic controlling means on the vehicle to its normal condition. This resetting means, as in my prior patent, No. 735,527, will preferably be controlled by fluid-pressure from a suitable source—as, for example, by the pressure in the air-reservoir, (not shown,) the pressure of the air being governed by a valve operated by the manual controller or throttle-lever when the engineer or motorman desires to start the train or vehicle again. This fluid-pressure controls the closing movement of the automatic relief-valve and also the resetting of all the elements of the automatic controlling means on the vehicle in operative condition. In the construction shown a pipe 64 is connected to a suitable source of pressure, preferably to the pipe 29, (though the connection is not shown herein,) and this pipe has at a suitable point a fluid-pressure-controlling valve 65, the other end of the pipe leading into one end of a small cylinder 66, containing a piston having a valve-resetting plunger or stem 67 secured thereto and projecting through the other end of the cylinder. On the opening of the automatic relief-valve on the operation of the automatic controlling means, as before described, the plunger 67 will be pushed back by the segment 19 by the action of the spring 24; but when the valve 65 is opened the pressure admitted to the cylinder 66 through the pipe 64 is sufficient to overcome the pull of the spring 24 and to force the segment 19 to the position shown in Fig. 1, said segment operating at such time to return the stop-arm 21 to its normal position with the end thereof in engagement with the detent on the armature 22. This opening of the valve 65 is usually accomplished by the engineer when he operates the manual controller to open the throttle-valve and start the vehicle or train. For the purpose of opening said valve 65 I have shown at 68 a short hooked lever resting on the stem of the valve 65 and operative to open said valve by depressing said valve-stem, while the lever 6 has at the lower end thereof a by-pass actuator or pawl 70, which in moving from the wide-open to the closed position of the throttle-lever passes by the end of the lever 68, but in moving from the closed to the open position forces said lever down and opens the valve 65, whereupon air is admitted through the pipe 64 and the plunger 67 is forced out to reset the gear-segment 19 and the parts controlled thereby in the positions shown in Fig. 1.

In my prior patents and applications I have in several instances shown means for indicating and recording the condition of the automatic means for controlling the movement of a vehicle each time that the vehicle passes a point at which such a controlling action can take place, in order that such indication or record may be used as a check upon the engineer or motorman. In these prior constructions, however, the indicating or recording means was responsive only to two conditions, one of which represented danger and the other safety, and only one of which corresponded to an electrical characteristic of a circuit or controlling device. In the present case I also employ indicating or recording means for the same purpose; but the means disclosed herein is very greatly modified as compared with my previous devices for this purpose, it being capable of indicating or recording not only whether an emergency operation does or does not take place, but also of indicating and recording all conditions or positions which it is possible for the controlling means to assume at any point on a line of way, whether at a controlling-point or between two widely-separated controlling-points. The main conditions of the automatic means for controlling the movements of the vehicle are the non-working condition, in which the apparatus on the vehicle is out of the sphere of influence of the corresponding controlling means at the track, the safety condition, in which the controlling means on the vehicle is not operated to check or stop the movement of the vehicle when such controlling means comes within the sphere of influence of the controlling means at the track, and the danger condition, which results in the operation of the automatic controlling means on the vehicle when within the sphere of influence of the controlling means at the track while a danger condition is present at such point on the track. In order to indicate and record all three of these conditions, I prefer to make use of indicating or recording means governed by differential electrical record-controlling devices which control the making of two different indications or records, while the absence of current or any other condition may control the making of the third indication or record. I have shown herein indicating or recording means capable of assuming three different positions, one of which represents danger, another safety, and the third the non-working condition of the indicating or recording means—that is, its condition when it is without the sphere of action of the train-stopping track-circuit and track-contacts, the danger and safety conditions being governed in such indicating or recording means by two differential electrical controlling devices, one of which is responsive to that electrical condition of the normally closed train-stopping track-circuit hereinbefore described which represents safety, and the other of which is responsive to that electrical condition of said normally closed circuit which represents danger. Thus one of such differential electrical record-controlling devices is governed by said train-controlling track-circuit when the resistence 49 is in said track-circuit and the other is controlled by said track-circuit when said resistance is cut out of the track-circuit. Any suitable means may be employed for indicating or recording these two different electrical conditions and the non-working condition of the automatic train-stopping means when the same is distant from the track-contacts 50 and 51. As here shown, this recording means is preferably included in parallel with the same electric circuit or short circuit that includes the controlling-magnet 23. In order to operate two differential electrical record-controlling devices selectively, the armature 22 of the controlling-electromagnet 23 constitutes with its magnet a main selector and governs such record-controlling devices selectively, according as the main selector 23 is or is not energized or is energized. From the terminal 71 a conductor 73 leads to one terminal of an electrical controlling device, here shown as an electromagnet 74, the other terminal of this magnet being connected by a conductor 75 to the conductor 62. The other terminal 72 is connected in a similar manner by a conductor 76 to one terminal of a differential electrical controlling device or magnet 77, the other side of which is also connected to the conductor 75. It will be evident from this that these two electrical controlling devices 74 and 77 are connected in parallel branches of the short circuit on the vehicle, but that both of their circuits cannot be simultaneously closed. The circuit of the controlling device 74 is closed when the resistance 49 is in the track-circuit, at which time the main controlling-magnet 23 is not sufficiently energized to attract its armature 22. The other controlling device 77 is energized only when the resistance 49 is cut out of the train-stopping track-circuit, at which time the electromagnet 23 is energized and attracts its armature and closes the break at 72.

It is important that all of the controlling or detecting devices or resistances in the track-circuit of the automatic means for controlling the movement of the vehicle and in the short circuit on the vehicle, as well as the controlling device or resistance in the block-circuit of the block-signal system, shall be so related to one another as to assure the proper carrying out of all the different controlling and detecting functions that have been hereinbefore described. While these resistances may of course be varied considerably, the following distribution of resistances has been found to work well in practice: The magnet or coils 44 may have a resistance of one thousand ohms, because it is desirable that only a very small amount of current shall flow through this controlling device, which amount will be sufficient to cause the armature 43 to be attracted whether the resistance 49 is or is not cut out of the train-stopping circuit. The resistance 49 may have a value of six ohms, the controlling device 41 a resistance of twenty ohms, the main controlling-magnet 23 on the vehicle a resistance of twenty-two ohms, and the two differential controlling devices 74 and 77 resistances of five and fifty ohms, respectively. With the resistances thus adjusted not only will all of the devices at the track coöperate properly, but the devices on the vehicle will also be energized or left unenergized, according as the electrical characteristic of the train-stopping track-circuit varies. Thus the current in said train-stopping circuit will not be sufficient to energize the main controlling-magnet or selector 23 when the traveling contact-makers 52 and 53 are in engagement with the contact-rails 50 and 51 if at such time the resistance 49 is in the train-stopping track-circuit. At such time, however, the current flowing in the circuit for controlling the movement of the vehicle will be sufficient to energize both the main magnet 23 and the secondary controlling device or magnet 74. With the resistance 49 cut out of the train-stopping track-circuit the current in the circuit for controlling the movement of the vehicle will be sufficient to energize the main magnet, attract the armature 22, close the parallel branch through the electromagnet 77, and keep the relatively high-resistance magnet 77 energized.

It will be seen from the foregoing that not only do the controlling devices 44 and 41 constitute detector devices for the block-signal circuit and the train-stopping track-circuit, respectively, but that the main controlling-magnet 23 and the secondary controlling-magnets 74 and 77 on the train also constitute main and secondary detector devices, which last two are responsive, respectively, according as the first or main magnet 23 on the vehicle is or is not energized, this magnet 23 being in turn responsive according as the train-stopping track-circuit exhibits one or another electrical characteristic—that is, according as it contains more or less resistance.

Figure 3:
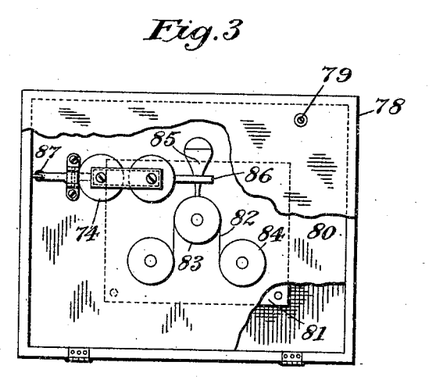
Fig. 3 is an enlarged detail showing, in side elevation, with parts broken away, the main elements of the recording means employed by me for indicating and recording the condition of the automatic controlling-circuit for governing the movement of the vehicle.

All of the elements of the indicating or recording means may be inclosed in a locked casing, such as 78, the lock 79, which gives access to the contents of this casing, not being under the control of the engineer or motorman when such casing is placed on the train, but being capable of being unlocked only by a key or combination in the possession of a superior officer of the road. The recording means will preferably include a time-train, which in this case is secured to the back of a substantially central partition 80, said clockwork being indicated in dotted lines at 81. This clockwork serves to impart movement to a feed-roll or equivalent device for feeding a record medium, such as a web of paper 82, from one point to another. This web of paper may be in the form of a roll and may be fed from a suitable supply-point to and wound upon a receiving spindle or roll, such as 84, this latter being the feed-roll and being positively actuated by the clockwork. In its passage from the supply-point to the receiving-point the web passes over an intermediate guide-roll or supporting-roll, such as 83, at which point the record may be made. This record may be made in any suitable way—as, for example, by a recording device 85 in the form of a stylus secured to one end of an armature 86.

Figure 4:
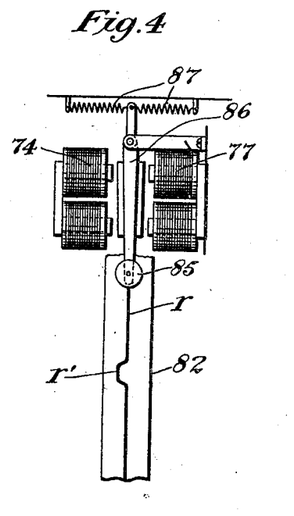
Figs. 4 and 5 are details illustrating in plan a portion of said recording means and show the different records representing danger and safety conditions and also the normal record representing the non-working condition of the recording means when the vehicle is not adjacent to a point at which it can be controlled by the track-circuit.
Figure 5:
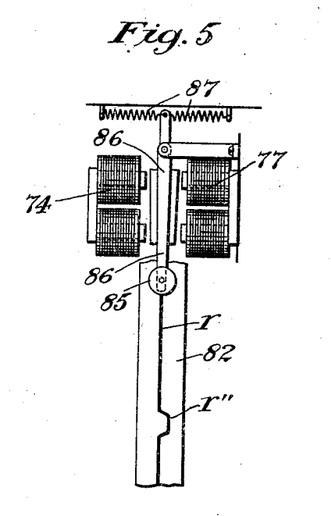

The parts just described are substantially similar to those illustrated in my prior application before specified. The armature 86 shown herein differs, however, from that of my prior application in that it is common to the two record-controlling devices or magnets 74 and 77 and is normally held in a central position away from the poles of both of these magnets. This central position of said armature may be controlled by a pair of springs 87, connected to fixed points at opposite sides of the armature, and when the armature is in this position it will locate the stylus 85 in a position for making a record corresponding to the non-working condition of the system. When, however, the apparatus on the vehicle is in coöperative relation with that at the track, the magnet 74 will be energized if a safety condition is present in the train-stopping track-circuit. At such time instead of making the record $r$, which represents the normal or non-working condition, the armature will be attracted to the left, as shown in Fig. 4, and will cause the stylus 85 to make the record $r'$. If when the traveling and fixed elements of the controlling system are in coöperative relation a danger condition is present in the train-stopping track-circuit, the magnet 77 will be energized, and a record, such as $r''$, will be made by the stylus. The two records $r'$ and $r''$ being at opposite sides of the normal or non-working record $r$ indicate clearly the difference between safety and danger, and by marking on the tape 82 a permanent record is made of the exact condition of affairs at all points on the line of way.

In order to prevent tampering with the conductors of the controlling means on the vehicle, all of the wires before described may be run through conduits of metal or other material, if desired.

Figures 7, 8:
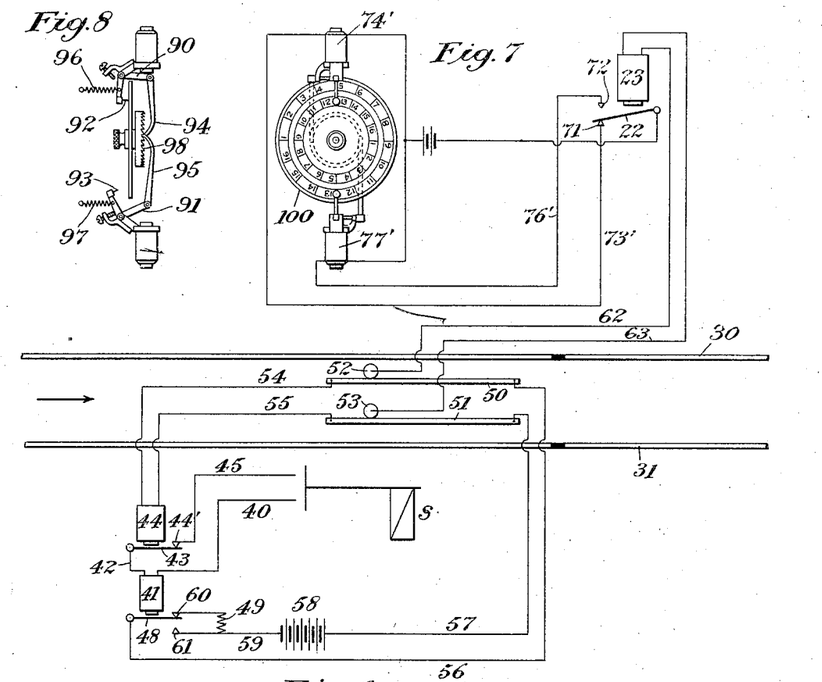
Fig. 7 is a diagrammatic view similar to Fig. 1 but illustrating a modification of the invention, in which a different type of recording means is connected in and controlled by a portion of the circuit of the automatic train-stopping means.
Fig. 8 is an edge elevation of the recording means shown in Fig. 7.

It is not essential that indicating or recording means of the type just described be placed on a traveling vehicle, and in Fig. 7 I have illustrated a modification of the invention in which indicating or recording means of another type is employed. In this view the track-rails, the portions of the block-signal circuit shown, the train-stopping track-circuit, and the main short circuit on the vehicle are identical with corresponding parts shown in the other views, and they are therefore designated by corresponding reference characters. The parts, however, which are governed by the main controlling-magnet 23 differ considerably from those before described. In this view the armature 22 of the electromagnet 23 is movable between a pair of contacts 71 and 72, the former of which is connected by a conductor 73' to one terminal of an electromagnet 74', similar to 74, and the contact 72 is connected by a conductor 76' to an electromagnet 77', similar to that at 77. Each of these magnets has a separate armature, that of the magnet 74' being shown at 90 and that of the magnet 77' being shown at 91. Each of these armatures is in the form of a bell-crank, pivoted at a suitable point and carrying at one end a recording device and at the other end a feed-pawl. The recording devices are designated, respectively, by 92 and 93 and the feed-pawls by 94 and 95. Springs, such as 96 and 97, may be employed for retracting the respective armatures and their recording devices. The two feed-pawls 94 and 95 coact with the teeth of the crown ratchet-wheel 98, which is secured to a recording medium 100, having in this case two concentric sets or circuits of divisions, the recording device governed by one electromagnet being adapted to make records in the divisions of one circuit and the recording device governed by the other electromagnet operating to make records in the divisions of the other circuit. Each time that either the magnet 74' or 77' is energized the armature thereof causes the corresponding recording device to make a record on the disk 100. On the deënergization of such magnet the spring of such armature actuates the pawl connected to that armature and causes the disk to be fed one space. The magnet 74' is governed by a safety condition of the train-stopping track-circuit and makes a record indicating safety on one of the inner divisions, and the magnet 77' is governed by a danger condition of such controlling track-circuit and makes a record representing danger in one of the outer divisions of the disk 100.

The recording means shown in Fig. 7 may also be placed at a fixed point beside the track for the purpose of making a complete record of the conditions existing at a given signal for the passage of all trains during a given period. When so used, said recording means is connected directly in the track-circuit by connecting a magnet similar to 23 in the conductor 56, for example, and operating the recorder from such magnet.

What I claim is—

1. The combination with a line of way, of controlling means on said line of way for governing the movement of a vehicle or train, and a signal-circuit separate therefrom and governing a semaphore or similar signal and governed as to its danger condition by a corresponding condition of said controlling means.

2. The combination with a line of way, of controlling means on said line of way for governing the movement of a vehicle or train, and a signal-circuit separate therefrom and governing a semaphore or similar signal and having a break governed as to its danger condition by a corresponding condition of said controlling means.

3. The combination with a line of way, of controlling means on said line of way for governing the movement of a vehicle or train, and a signal-circuit governing a semaphore or similar signal and having a break normally closed by said controlling means.

4. The combination with a line of way, of a pair of electric circuits, one of which governs the power, brake, or other movement-controlling medium on a vehicle or train, and the other of which governs a semaphore or similar signal and is governed by said first circuit.

5. The combination with a line of way, of a pair of electric circuits, one of which governs the power, brake, or other movement-controlling medium on a vehicle or train, and the other of which governs a semaphore or similar signal and has a break governed by said first circuit.

6. The combination with a line of way, of a pair of electric circuits, one of which governs the power, brake, or other movement-controlling medium on a vehicle or train, and the other of which governs a semaphore or similar signal and has a break normally closed by said first circuit.

7. The combination with a line of way, of a pair of electric circuits, one of which is normally closed and governs the power, brake or other movement-controlling medium on a vehicle or train, and the other of which governs a semaphore or similar signal and has a break normally closed by said first circuit.

8. The combination with a line of way, of a pair of electric circuits one of which is a track-circuit, and one of which governs the power, brake or other movement-controlling medium on a vehicle or train, and the other of which governs a semaphore or similar signal and is governed by said first circuit.

9. The combination with a line of way, of a pair of track-circuits one of which governs the power, brake or other movement-controlling medium on a vehicle or train, and the other of which governs a semaphore or similar signal and is governed by said first circuit.

10. The combination with a line of way, of a pair of electric circuits, one of which governs the power, brake or other movement-controlling medium on a vehicle or train, and the other of which governs a semaphore or similar signal and is governed by said first circuit, and means for intermittently varying the strength of the current flowing in said first circuit.

11. The combination with a line of way, of a pair of electric circuits, one of which governs the power, brake, or other movement-controlling medium on a vehicle or train, and the other of which governs a semaphore or similar signal and is governed by said first circuit, and means controlled by a danger condition on the line of way for intermittently increasing the strength of the current flowing in said first circuit.

12. The combination with a line of way, of a pair of electric circuits, one of which governs the power, brake or other movement-controlling medium on a vehicle or train, and the other of which governs a semaphore or similar signal and is governed by said first circuit, and means controlled by said second circuit for intermittently increasing the strength of the current flowing in said first circuit.

13. The combination with a line of way, of a pair of electric circuits, one of which governs the power, brake or other movement-controlling medium on a vehicle or train and includes a resistance adapted to be short-circuited by a danger condition on the line of way, and the other of which governs a semaphore or similar signal and is governed by said first circuit.

14. The combination with a line of way, of a pair of electric circuits, one of which is normally closed and governs the power, brake or other movement-controlling medium on a vehicle or train and includes a resistance adapted to be short-circuited by a danger condition on the line of way, and the other of which governs a semaphore or similar signal and is governed by said first circuit.

15. The combination with a line of way, of an electric circuit governing the power, brake or other movement-controlling medium on a vehicle or train, a semaphore, and means for actuating said semaphore and increasing the strength of the current flowing in said circuit.

16. The combination with a line of way, of an electric circuit governing the power, brake or other movement-controlling medium on a vehicle or train and including a resistance adapted to be short-circuited, a semaphore, and means for actuating said semaphore and short-circuiting said resistance.

17. The combination with a line of way, of a normally closed electric circuit governing the power, brake or other movement-controlling medium of a vehicle or train and including a resistance adapted to be short-circuited, a semaphore, and means for actuating said semaphore and short-circuiting said resistance.

18. The combination with a line of way, of a pair of electric circuits, one of which governs the power, brake or other movement-controlling medium of a vehicle or train and includes a resistance adapted to be short-circuited by a danger condition on the line of way, and the other of which governs a semaphore or similar signal and also governs the short-circuiting of said resistance and is governed by said first circuit.

19. The combination with a line of way and with a vehicle movable therealong, of a normally closed track-circuit, means located at a fixed point on the line of way for intermittently varying the strength of the current in said closed circuit, a semaphore or similar signal which is not influenced by said variations of current strength, and an automatic controller governing the movement of said vehicle and controlled by said track-circuit.

20. The combination with a line of way and with a vehicle movable therealong, of a normally closed track-circuit, means located at a fixed point on the line of way for intermittently increasing the strength of the current in said closed circuit, a semaphore or similar signal which is not influenced by said variations of current strength, and an automatic controller governing the movement of said vehicle and controlled by said track-circuit.

21. The combination with a line of way and with a vehicle movable therealong, of a semaphore or similar signal, a normally closed track-circuit including a resistance having no control over said semaphore, means located at a fixed point on the line of way for short-circuiting said resistance, and an automatic controller governing the movement of said vehicle and controlled by said track-circuit.

22. The combination with a line of way and with a vehicle movable therealong, of a semaphore or similar signal, a normally closed track-circuit including a resistance having no control over said semaphore, means located at a fixed point on the line of way for automatically short-circuiting said resistance, and an automatic controller governing the movement of said vehicle and controlled by said track-circuit.

23. The combination with a line of way and with a vehicle movable therealong, of a semaphore or similar signal, a normally closed track-circuit including a resistance having no control over said semaphore, an automatic controller governing the movement of said vehicle, and a short circuit on the line of way and governing the operation of said controller and controlled by current in the track-circuit and adapted to short-circuit said resistance.

24. The combination with a line of way, of a pair of electric circuits, one of which is normally closed and governs the power, brake or other movement-controlling medium on a vehicle or train and includes a resistance adapted to be short-circuited by a danger condition on the line of way, and the other of which governs a semaphore or similar signal and also governs the short-circuiting of said resistance and is governed by said first circuit.

25. The combination with a line of way, of a pair of electric circuits, one of which governs the power, brake or other movement-controlling medium on a vehicle or train, and the other of which governs a semaphore or similar signal, and each of which governs the other.

26. The combination with a line of way, of a pair of electric circuits, one of which governs the power, brake or other movement-controlling medium on a vehicle or train, and the other of which governs a semaphore or similar signal, and each of which governs a danger condition of the other.

27. The combination with a line of way, of a pair of electric circuits, one of which governs the power, brake or other movement-controlling medium on a vehicle or train, and the other of which governs a semaphore or similar signal and embodies a detector device responsive to a danger condition of the first circuit.

28. The combination with a line of way, of a pair of electric circuits, one of which governs the power, brake or other movement-controlling medium on a vehicle or train, and the other of which governs a semaphore or similar signal and each of which embodies a detector device responsive to a danger condition of the other circuit.

29. The combination with a line of way, of a pair of electric circuits, one of which is normally closed and governs the power, brake or other movement-controlling medium on a vehicle or train, and the other of which governs a semaphore or similar signal and embodies a detector device responsive to a danger condition of the first circuit.

30. The combination with a line of way, of a pair of electric circuits, one of which governs the power, brake or other movement-controlling medium on a vehicle or train and includes a resistance adapted to be short-circuited, and the other of which includes the immediate electrical signal-controlling means for a semaphore or similar signal and governs the short-circuiting of said resistance of the first circuit.

31. The combination with a line of way, of a pair of electric circuits, one of which is normally closed and governs the power, brake or other movement-controlling medium on a vehicle or train and includes a resistance adapted to be short-circuited, and the other of which includes the immediate electrical signal-controlling means for a semaphore or similar signal and governs the short-circuiting of said resistance of the first circuit.

32. The combination with a line of way, of a track-circuit for controlling the movement of a vehicle and including an electrical controlling device adapted to be short-circuited, and a signal-circuit controlling a semaphore or similar signal and governed by said electrical controlling device.

33. The combination with a line of way, of a normally closed track-circuit for controlling the movement of a vehicle and including an electrical controlling device adapted to be short-circuited, and a signal-circuit controlling a semaphore or similar signal and governed by said electrical controlling device.

34. The combination with a line of way, of a track-circuit for controlling the movement of a vehicle and including an electrical controlling device adapted to be short-circuited by a vehicle on said line of way, and a semaphore or similar signal governed by said electrical controlling device.

35. The combination with a line of way, of a track-circuit for controlling the movement of a vehicle and including an electrical controlling device adapted to be short-circuited, and a signal-circuit controlling a semaphore or similar signal and embodying a detector device governed by said electrical controlling device.

36. The combination with a line of way, of a track-circuit for controlling the movement of a vehicle and including an electrical controlling device adapted to be short-circuited, and a signal-circuit controlling a semaphore or similar signal and controlled by said device.

37. The combination with a line of way and with a vehicle movable therealong, of a pair of controlling means one of which governs the other, and one of which is a normal danger system of block-signals, and the other of which is means for automatically governing the movement of said vehicle.

38. The combination with a line of way and with a vehicle movable therealong, of a pair of controlling means each of which governs the other, and one of which is a normal danger system of block-signals, and the other of which is means for automatically governing the movement of said vehicle.

39. The combination with a line of way and with a vehicle movable therealong, of a pair of controlling means one of which governs the other, and one of which is a normal danger system of block-signals, and the other of which is means for automatically controlling a brake or brakes on said vehicle.

40. The combination with a line of way and with a vehicle movable therealong, of a pair of controlling means one of which governs the other, and one of which is a normal danger system of block-signals, and the other of which is means for automatically controlling the power mechanism and brakes of said vehicle.

41. The combination with a line of way and with a vehicle movable therealong and operated by fluid-pressure, of a throttle-valve governing said fluid-pressure, a brake, and a pair of controlling means one of which is governed by the other, and one of which is a normal danger system of block-signals, and the other of which is means for automatically controlling said throttle-valve and brake.

42. The combination with a line of way and with a vehicle movable therealong, of a pair of controlling means one of which governs the other, and one of which is a normal danger system of block-signals, and the other of which is an electric circuit for automatically governing the movement of said vehicle.

43. The combination with a line of way and with a vehicle movable therealong, of a pair of controlling means one of which governs the other, and one of which is a normal danger system of block-signals, and the other of which is a normally closed electric circuit for automatically governing the movement of said vehicle.

44. The combination with a line of way and with a vehicle movable therealong, of a pair of controlling means one of which governs the other, and one of which is a normal danger system of block-signals and includes a block-circuit having a normally closed break, and the other of which is an electric circuit for automatically governing the movement of said vehicle and also governs said break in the block-circuit.

45. The combination with a line of way and with a vehicle movable therealong, of an automatic controller governing the movement of said vehicle, and a pair of controlling means one of which is a track-circuit governing said automatic controller and including a resistance, and the other of which is a normal danger system of block-signals governing the short-circuiting of said resistance.

46. The combination with a line of way and with a vehicle movable therealong, of an automatic controller governing the movement of said vehicle, and a pair of controlling means one of which is a normally closed track-circuit governing said automatic controller and including a resistance, and the other of which is a normal danger system of block-signals governing the short-circuiting of said resistance.

47. The combination with a line of way and with a vehicle movable therealong, of a pair of controlling means, one of which is a normal danger system of block-signals and includes a block-circuit having a normally closed break, and the other of which is an electric circuit for automatically governing the movement of said vehicle and governs said break in said block-circuit and is also governed by said block-circuit.

48. The combination with a line of way and with a vehicle movable therealong, of a pair of controlling means, one of which is a normal danger system of block-signals and includes a block-circuit, and the other of which is an electric circuit for automatically governing the movement of said vehicle and also governs and is governed by a danger condition of said block-circuit.

49. The combination with a line of way, of a pair of controlling means, one of which is a normal danger system of block-signals, and the other of which governs a signal device of a different character and is governed by said first controlling means.

50. The combination with a line of way, of a pair of controlling means, one of which is a normal danger system of block-signals, and the other of which is means governed by such block-signal system for automatically governing the movement of a vehicle.

51. The combination with a line of way, of a pair of controlling means, one of which is a normal danger system of block-signals, and the other of which is means governed by such block-signal system for automatically controlling a brake or brakes on a vehicle.

52. The combination with a line of way, of a pair of controlling means, one of which is a normal danger system of block-signals, and the other of which is means governed by such block-signal system for automatically controlling the power mechanism and brakes on a vehicle.

53. The combination with a line of way and with a vehicle movable therealong and operated by fluid-pressure, of a throttle-valve governing said fluid-pressure, a brake, and a pair of controlling means, one of which is a normal danger system of block-signals, and the other of which is means governed by such block-signal system for automatically controlling said throttle-valve and brake.

54. The combination with a line of way, of a pair of controlling means, one of which is a normal danger system of block-signals, and the other of which is an electric circuit governed by such block-signal system for automatically governing the movement of a vehicle.

55. The combination with a line of way, of a pair of controlling means, one of which is a normal danger system of block-signals, and the other of which is a normally closed electric circuit governed by such block-signal system for automatically governing the movement of a vehicle.

56. The combination with a line of way, of means for automatically controlling the power, brake or other movement-controlling medium of a vehicle traveling thereon, and means for indicating danger, safety, and non-working conditions of such controlling means.

57. The combination with a line of way, of means for automatically controlling the movement of a vehicle traveling thereon, and means for recording danger, safety and non-working conditions of such controlling means.

58. The combination with a line of way and with a vehicle movable therealong, of means for automatically controlling the power, brake or other movement-controlling medium of said vehicle, and means on the vehicle for indicating danger, safety, and non-working conditions of such controlling means.

59. The combination with a line of way and with a vehicle movable therealong, of means for automatically controlling the movement of said vehicle, and means on the vehicle for recording danger, safety, and non-working conditions of such controlling means.

60. The combination with a line of way and with a vehicle movable therealong, of means for automatically controlling the movement of said vehicle, a recording device, and means for shifting said recording device to three recording positions representing danger, safety, and non-working conditions of such controlling means.

61. The combination with a line of way and with a vehicle movable therealong, of means for automatically controlling the movement of said vehicle, a recording device on the vehicle, and means for shifting said recording device to three recording positions representing danger, safety, and non-working conditions of such controlling means.

62. The combination with a line of way and with a vehicle movable therealong, of means for automatically controlling the movement of said vehicle, means for imparting traveling movement to a record medium, a recording device movable crosswise to the line of travel of such record medium, and means for shifting said recording device to three positions representing danger, safety, and non-working conditions of such controlling means.

63. The combination with a line of way and with a vehicle movable therealong, of means for automatically controlling the movement of said vehicle, a recording device having a normal recording position corresponding to the non-working condition of such controlling means, and a pair of actuators controlled respectively by the danger and safety conditions of such controlling means and controlling the making of records in two other recording positions.

64. The combination with a line of way, of an electric circuit for automatically controlling the power, brake or other movement-controlling medium of a vehicle traveling on said line of way, means for indicating the condition of said circuit, and differential controlling devices responsive to different electrical conditions of said circuit and controlling such indicating means.

65. The combination with a line of way, of an electric circuit for automatically controlling the power, brake or other movement-controlling medium of a vehicle traveling on said line of way, means for indicating danger and safety conditions of said circuit, and differential controlling devices responsive respectively to danger and safety conditions of said circuit and controlling such indicating means.

66. The combination with a line of way, of an electric circuit for automatically controlling the power, brake or other movement-controlling medium of a vehicle traveling on said line of way, said circuit being adapted to exhibit different electrical characteristics corresponding to danger and safety conditions, means for indicating said different characteristics of said circuit, and differential electrical controlling devices governed respectively by said different electrical characteristics of said circuit and controlling such indicating means.

67. The combination with a line of way, of an electric circuit for automatically controlling the power, brake or other movement-controlling medium of a vehicle traveling on said line of way, said circuit being adapted to exhibit different characteristics corresponding to danger and safety conditions, a controlling-selector having selecting functions corresponding to and controlled respectively by said different characteristics of said circuit, and means governed by said selector for indicating said different characteristics of said circuit.

68. The combination with a line of way, of an electric circuit for automatically controlling the power, brake or other movement-controlling medium of a vehicle traveling on said line of way, said circuit being adapted to exhibit different electrical characteristics corresponding to danger and safety conditions, a controlling-selector having selecting functions corresponding to and controlled respectively by said different electrical characteristics of said circuit, and means governed by said selector for indicating said different characteristics of said circuit.

69. The combination with a line of way, of an electric circuit for automatically controlling the power, brake or other movement-controlling medium of a vehicle traveling on said line of way, said circuit being adapted to exhibit different electrical characteristics corresponding to danger and safety conditions, a controlling-selector having selecting functions corresponding to and controlled respectively by said different electrical characteristics of said circuit, means for indicating said different characteristics of said circuit, and differential electrical controlling devices governed respectively by the different selecting functions of said selector and controlling such indicating means.

70. The combination with a line of way, of an electric circuit for automatically controlling the movement of a vehicle traveling on said line of way, said circuit being adapted to exhibit different electrical characteristics corresponding to danger and safety conditions, means for recording said different characteristics of said circuit, and differential electrical controlling devices governed respectively by said different electrical characteristics of said circuit and controlling such recording means.

71. The combination with a line of way, of an electric circuit for automatically controlling the movement of a vehicle traveling on said line of way, said circuit being adapted to exhibit different electrical characteristics corresponding to danger and safety conditions, a controlling-selector having selecting functions corresponding to and controlled respectively by said different electrical characteristics of said circuit, and means governed by said selector for recording said different characteristics of said circuit.

72. The combination with a line of way, of an electric circuit for automatically controlling the movement of a vehicle traveling on said line of way, said circuit being adapted to exhibit different electrical characteristics corresponding to danger and safety conditions, a controlling-selector having selecting functions corresponding to and controlled respectively by said different electrical characteristics of said circuit, means for recording said different characteristics of said circuit, and electrically-differentiated record-controlling devices governed respectively by the different selecting functions of said selector and controlling such recording means.

73. The combination with a line of way, of an electric circuit for automatically controlling the power, brake or other movement-controlling medium of a vehicle on said line of way, said circuit having a resistance adapted to be short-circuited, means for indicating different conditions of said circuit, and differential electrical controlling devices governed by such differences in the resistance of said circuit and controlling such indicating means.

74. The combination with a line of way, of an electric circuit for automatically controlling the movement of a vehicle on said line of way, said circuit having a resistance adapted to be short-circuited, means for recording danger and safety conditions of said circuit, and differential electrical controlling devices governed by such differences in the resistance of said circuit and controlling such recording means.

75. The combination with a line of way, of an electric circuit for automatically controlling the power, brake or other movement-controlling medium of a vehicle on said line of way, said circuit having a resistance adapted to be short-circuited, a controlling-selector having selecting functions corresponding to and controlled respectively by such differences in the resistance of said circuit, and means governed by said selector for indicating said different characteristics of said circuit.

76. The combination with a line of way, of a normally closed electric circuit for automatically controlling the power, brake or other movement-controlling medium of a vehicle traveling on said line of way said circuit having a resistance adapted to be short-circuited, means for indicating different conditions of said circuit, and differential electrical controlling devices governed by such differences in the resistance of said circuit and controlling said indicating means.

77. The combination with a line of way, of an electric circuit for automatically controlling the power, brake or other movement-controlling medium of a vehicle traveling on said line of way said circuit being adapted to exhibit different characteristics corresponding to danger and safety conditions, and differential electrical detector devices responsive to such different characteristics of said circuit.

78. The combination with a line of way, of a normally closed electric circuit for automatically controlling the power, brake or other movement-controlling medium of a vehicle traveling on said line of way said circuit being adapted to exhibit different characteristics corresponding to danger and safety conditions, and differential electrical detector devices responsive to such different characteristics of said circuit.

79. The combination with a line of way, of a normally closed electric circuit for automatically controlling the power, brake or other movement-controlling medium of a vehicle traveling on said line of way said circuit being adapted to exhibit different characteristics corresponding to danger and safety conditions, and differential electrical detector devices carried by such vehicle and responsive to such different characteristics of said circuit.

80. The combination with a line of way, of a normally closed electric circuit for automatically controlling the power, brake or other movement-controlling medium of a vehicle traveling on said line of way said circuit having a resistance adapted to be short-circuited, and differential electrical detector devices one of which is responsive when the total resistance is in circuit and the other of which is responsive when the aforesaid resistance is short-circuited.

81. The combination with a line of way, of a normally closed electric circuit for automatically controlling the power, brake or other movement-controlling medium of a vehicle traveling on said line of way said circuit having a resistance adapted to be short-circuited, and differential electrical detector devices carried by said vehicle and one of which is responsive when the total resistance is in circuit and the other of which is responsive when the aforesaid resistance is short-circuited.

82. The combination with a line of way, of an electric circuit for automatically controlling the movement of a vehicle traveling on said line of way said circuit being adapted to exhibit different characteristics corresponding to danger and safety conditions, a main electrical detector device adapted to be energized or deënergized according as said circuit exhibits one or the other of said characteristics, and secondary electrical detector devices one of which is responsive when the main detector device is energized and the other of which is responsive when said main detector device is deënergized.

83. The combination with a line of way, of a normally closed electric circuit for automatically controlling the movement of a vehicle traveling on said line of way said circuit having a resistance adapted to be short-circuited, a main electrical detector device adapted to be energized or deënergized according as said resistance is or is not short-circuited, and secondary electrical detector devices one of which is responsive when the main detector device is energized and the other of which is responsive when said main detector device is deënergized.

84. The combination with a line of way, of a normally closed electric circuit for automatically controlling the movement of a vehicle traveling on said line of way said circuit having a resistance adapted to be short-circuited, a main electrical detector device adapted to be energized or deënergized according as said resistance is or is not short-circuited, and secondary electrical detector devices the resistances of which differ from each other and one of which is responsive when the main detector device is energized and the other of which is responsive when said main detetector device is deënergized.

85. The combination with a line of way, of an electric circuit for automatically controlling the movement of a vehicle traveling on said line of way said circuit being adapted when closed to exhibit different characteristics, and a short circuit on the vehicle and containing three parallel branches one of which includes a main electrical detector device adapted to be energized or deënergized according as said circuit exhibits one or another characteristic and the others of which include respectively a pair of secondary electrical detector devices one of which is responsive when the main detector device is energized and the other of which is responsive when the main detector device is deënergized.

86. The combination with a line of way, of a pair of controlling means, one of which governs the power, brake, or other movement-controlling medium on a vehicle or train, and the other of which governs a semaphore or similar signal and each of which governs the other.

Signed at New York, in the county of New York and State of New York, this 14th day of April, A. D. 1905.

FRANK E. KINSMAN

Witnesses:
C. S. Champion,
R. Champion.